(12) United States Patent
Watanabe et al.

(10) Patent No.: US 6,763,284 B2
(45) Date of Patent: Jul. 13, 2004

(54) ROBOT TEACHING APPARATUS

(75) Inventors: Atsushi Watanabe, Tokyo (JP);
Tetsuya Kosaka, Yamanashi (JP);
Katsutoshi Takizawa, Yamanashi (JP);
Fumikazu Warashina, Yamanashi (JP);
Kazunori Ban, Yamanashi (JP);
Makoto Yamada, Yamanashi (JP);
Akihiro Terada, Fujiyoshida (JP);
Mitsuhiro Okuda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 72 days.

(21) Appl. No.: 10/001,991

(22) Filed: Dec. 5, 2001

(65) Prior Publication Data

US 2003/0078694 A1 Apr. 24, 2003

(30) Foreign Application Priority Data

Dec. 7, 2000 (JP) ....................................... 2000-373388

(51) Int. Cl.[7] .............................................. G05B 19/00
(52) U.S. Cl. ...................... 700/264; 700/177; 700/195; 700/295; 700/254; 700/262; 600/426; 600/427; 600/429; 318/568.14; 219/121.67; 219/121.78; 901/42; 33/503
(58) Field of Search ................................ 700/177, 264, 700/166, 254, 259, 245, 195, 262; 606/1, 130; 356/615; 600/626, 427, 429; 342/458, 64; 382/141; 318/568.14; 219/121.67, 121.78, 86.25, 125.1; 901/42; 33/503

(56) References Cited

U.S. PATENT DOCUMENTS

| | | | | |
|---|---|---|---|---|
| 5,408,537 A | * | 4/1995 | Major ......................... | 382/141 |
| 5,698,121 A | * | 12/1997 | Kosaka et al. .......... | 219/121.67 |
| 5,793,011 A | * | 8/1998 | Watanabe et al. ............ | 219/109 |
| 6,044,308 A | * | 3/2000 | Huissoon .................... | 700/166 |
| 6,144,452 A | * | 11/2000 | Hachiya ..................... | 356/615 |
| 6,236,924 B1 | * | 5/2001 | Motz et al. .................... | 701/50 |
| 6,606,539 B2 | * | 8/2003 | Raab .......................... | 700/245 |
| 2003/0144765 A1 | * | 7/2003 | Habibi et al. ............... | 700/259 |

FOREIGN PATENT DOCUMENTS

| | | |
|---|---|---|
| JP | 62-282889 | 12/1987 |
| JP | 6-110544 | 4/1994 |
| JP | 10-76489 | 3/1998 |

OTHER PUBLICATIONS

Nkamura et al., Development of off–line programming system for spot welding robot, 1993, IEEE, pp. 223–228.*
Cheng et al., Adaptive synchronization control of a robotic manipulator operating in an intelligent workcell, 1990, IEEE, pp. 119–126.*
Lee et al., A dynamic programming approach to a reel assignment proglem of a surface mounting machine in printed circuit board assembly, 1998, IEEE, pp. 227–232.*
HPFIT, High precision fitting, 1997, Internet, pp. 1–15.*
Yeasin et al., Toward Automatic Robot Programming: Learning Human Skill from Visual Data , 2000, Internet/IEEE, pp. 1083–1084.*
Saki Corporation, Hight Speed Visual Inspectin System for Printed Circuit Board, 1999, Internet, pp. 00–007.*
Bruker Daltonics, Automation of MALDI–TOF analysis for proteiomics, 1999, Internet, pp. 1–5.*
Marchand et al., From data–flow task to multitasking: applying the synchronous approach to active vision in robotics, 1997, IEEE, pp. 200–216.*

* cited by examiner

Primary Examiner—William A Cuchlinski, Jr.
Assistant Examiner—McDieunel Marc
(74) Attorney, Agent, or Firm—Staas & Halsey LLP (57) ABSTRACT

An image of a reference object is captured using a camera and displayed. A measurement starting point is pointed by an image position pointing device. A corresponding view line is obtained using a position on the image and a position and a direction of the camera, a robot approaches to the reference object such that it does not deviate from a projecting direction to move to a position suitable for measurement. A light is projected on the reference object and measurement of an inclination of a face of the object in the vicinity of a measuring point is started. An image including a bright line image on the reference object is photographed and 3-dimensional positions of points sequentially measured along a working line. A movement path of a robot is created using these positions as teaching points for a working robot.

15 Claims, 5 Drawing Sheets

ROBOT TEACHING APPARATUS

BACKGROUND OF THE INVENTION

1. Field of the Invention

The present invention relates to a robot teaching apparatus used in an operation for teaching a motion position to an industrial robot.

2. Description of the Related Art

As a typical technique which is often employed for teaching a motion position of a robot, there is a so-called playback system. When this technique is used, a robot is manually moved to a position where the robot must move actually, and its position is stored in a robot controller.

As another typical technique, there is a so-called off-line teaching. In this technique, using an off-line programming device, an environmental model including a robot and/or an object to be worked is established and a position to which the robot has to move is obtained according to the model by a calculation. The teaching position thus obtained is stored in a robot controller, for example, through a transfer.

When the playback system is employed, since positions required for an operation of the robot (positions to be taught) are taught to the robot one by one, much time and labor are required. It is not rare that the number of teaching positions required for an actual work amounts to a large number (for example, 100).

On the other hand, when the off-line teaching is utilized, it is necessary to input a model of a motion object into an off-line teaching device. In this case, there is a drawback in that, unless a shape of the object is defined as a CAD model or the like in advance, it is difficult to input the shape accurately and much time is required for inputting the shape model.

SUMMARY OF THE INVENTION

An object of the present invention is to provide a robot position teaching apparatus which can perform an operation position teaching operation of a robot easily with a high accuracy. Also, another object of the invention is to provide a robot position teaching apparatus which is suitable particularly for a movement path teaching for a robot performing operation while moving along a linear or curved operation route.

For achieving the above object, in the present invention, positions of points on an operating line of a work object are measured by a 3-dimensional position and attitude measuring device (sensor) constituted by a camera and light projecting means. Teaching point data for operating a robot is created from information about 3-dimensional positions of points constituting the working line, which is obtained from this measurement.

The light projecting means projects a pattern light (which is typically a slit light or a spot light) in the vicinity of a point to be measured (hereinafter, referred to as a "measurement point"). An object projected with the pattern light is photographed by a camera, and information about a 3-dimentional position of the portion on which the pattern light is projected is captured by image analysis.

Here, as is well-known, in a case where such a pattern light is a slit light, measurement is made by projecting slit lights on a measurement point from two different directions and a 3-dimensional position and an orientation of a face (plane) in the vicinity of the measurement point are calculated from the measurement result.

On the other hand, in a case where such a pattern light is a spot light, measurement is made by projecting spot lights on three or more different points which are not on a straight line and a 3-dimentional position and an orientation of a plane on which these points are positioned are calculated from the measurement result.

In this case, three points positioned near one another are selected and one of these points is set as a target measurement point, or three points (or more points) positioned near a target measurement point are selected and a 3-dimensional position and an orientation of a plane on which the target measurement point is positioned are obtained from the measurement results of these points. For example, the measurement position can be caused to correspond to the geometrical center of gravity position formed by the three points.

Briefly speaking, in the present invention, the 3-dimensional position sensor provided with light projecting means of such a pattern light as a slit light, a spot light or the like and a camera is utilized so that a 3-dimensional position of a target measurement point is measured. Also, an inclination (orientation) of a surface (an area near the measurement point which can be regarded as a flat plane) is calculated together with the measurement of the 3-dimensional position. The attitude of the target measurement point can be represented by this orientation of the surface.

Incidentally, well known is a principle which uses the 3-dimensional position sensor provided with light projecting means of such a pattern light as a slit light, a spot light or the like and a camera to obtain a 3-dimentional position of a target measurement point. That is, by using data obtained through calibration regarding the light projecting means and the camera, a 3-dimensional position of a target point can be calculated within a sensor or the like from the position of a measurement point on an image obtained by the camera and a light projecting state (data representing projecting orientation and position of the pattern light) at this time.

In a case where the light projector or the camera of the 3-dimensional position sensor is mounted on a distal end portion of a hand of a robot, the 3-dimensional position of the target point can once be obtained on a coordinate system (for example, a tool coordinate system) fixed on the distal end portion of the hand of the robot. Even in such a case, by using data about the current position of the robot at this time, the coordinate system can easily be converted to a coordinate system (for example, a world coordinate system, a work coordinate system or the like) fixed to a working space.

Here, when the above target measurement points are sequentially defined and measured along a working line on an object to be measured, teaching points for a working robot for performing work along the working line can be obtained.

In view of the above, a robot teaching apparatus according to the present invention is a robot teaching apparatus of a type that a teaching robot mounted with light projecting means for projecting a slit light or a spot light on an object as a pattern light and a camera is used to perform working along a working line on the object, and comprises: means for obtaining a 3-dimensional position and an orientation of a face of an object on which the pattern light has been projected, from an image of the camera about the face of the object; means for specifying points constituting the working line on the image of the camera; and means for obtaining the specified 3-dimentional positions of the points constituting the working line, on the basis of the 3-dimensional position and the attitude of the face and the positions of the points on the camera image constituting the working line.

By using the robot teaching apparatus according to the present invention, it becomes unnecessary to perform a playback motion on an object robot to be taught. Also, it is not required to constitute a model for an off-line teaching, so that a teaching work for a robot can easily be performed.

BRIEF DESCRIPTION OF THE DRAWINGS

The above and other objects and features of the present invention will become apparent from explanation of the following embodiments with reference to the attached drawings, in which.

DESCRIPTION OF THE EMBODIMENTS

A first embodiment of the present invention will be explained with reference to FIG. 1.

Reference numeral 5 denotes a robot which is an object to be taught. Mounted at an arm distal end of the robot 5 are an image pickup device (camera) 2 and a projector 1. The projector 1 has a function for projecting a pattern light. In the embodiment shown in FIG. 1, a slit light projecting type is employed as the projector 1.

A robot controller 6 is of a type that an image processing device is housed therein, and it is connected to the robot 5, the projector 1, the image pickup device 2, a display device 3 and a teaching operation panel (not shown). Provided in this robot controller 6 are not only hardware and software for a normal robot control, but also hardware and software for instructing projecting operations (on/off, a projecting direction, etc.) of the projector 1, and a hardware and a software for photographing the image pickup device 2 or taking-in of photographed images, performing required image processing, transmission of image signals to the display device 3 or the like.

Incidentally, it is assumed here that a position teaching for performing working on an object to be worked has not been carried out yet. Also, it is assumed here that a reference work 7 is an object which serves as a reference for a teaching operation and it is positioned correctly in a working space for teaching. In other words, it is assumed here that this reference work 7 is maintained at a position and with an attitude with which the robot 5 performs working actually at a reproduction operation time after a position teaching has been completed.

For teaching, first, the robot 5 is caused to move with a manual operation to a position and an attitude at which it is properly spaced from the reference work 7 and it looks over the entire working space. Next, an image including the reference work 7 in a field of view is picked up by the camera and the image is displayed on the image display device 3.

A 2-dimensional image position pointing device 4 utilizing a mouse or the like is provided in the image display device 3, and an operator points a position (measurement starting point) to be measured by the robot 5 on the image using this pointing device 4. The pointed position (u0, v0) on the image is stored in the robot controller 6.

Such pointing of a position to be measured can include not only pointing of the measurement starting point in the manner described above but also include pointing of a plurality of points constituting a working line on an image by using the pointing device 4, specifying of a working line by moving the pointing device 4 along the working line, specifying of a window which specifies a region where a working line exists on an image by using the pointing device 4, and so on.

The measurement starting point is ordinarily selected on a working line on which an actual working is performed and in the vicinity of a work starting point. For example, in a case of a welding robot, the working line corresponds to a welding line and the work starting point corresponds to a starting end of the welding line.

After the measurement starting point is specified, a view line (a 3-dimensional straight line connecting the measurement starting point and a center of a lens of the image pickup device 2) corresponding to the position (u0, v0) is obtained using the position (u0, V0) on the 2-dimensional image and the position and the orientation of the image pickup device 2. The robot is caused to approach the reference work 7 such that a projecting direction of the projector 1 does not deviate from the view line, so that it is moved up to a position where a 3-dimensional position on the reference work 7 and an inclination of the face at the position can be measured.

Next, a slit light is projected from the projector 1 onto the reference work 7, measurement of a 3-dimensional position on the reference work 7 and an inclination (orientation) of a face in the vicinity thereof is started. A projecting direction (a position and a direction of a bright line formed on the reference work 7 by a slit line) of a slit line at the measurement starting time is adjusted such that it crosses the working line in the vicinity of the specified measurement starting point. An image including an image of the bright line formed on the reference work 7 is photographed by the camera 2 and a 3-dimensional position (x1, y1, z1) of the measurement starting point is measured according to the principle of a trigonometrical survey. The position on the image corresponding to this measurement starting point is defined as (u1, v1). Since the principle of the measurement and processing performed for measurement by the robot controller 6 are well known, description thereof will be omitted here.

The robot is moved along a working path a small distance by a small distance, and light projecting and photographing are performed for each small distance movement, so that 3-dimensional positions (x2, y2, z2), (x3, y3, z3) . . . of points at which the bright line crosses the working line are sequentially obtained.

The 3-dimentional positions (xi, yi, zi) [i=1, 2 . . . ] of a sequence of the points which constitute the working line thus obtained are utilized as teaching points of the robot to produce a movement path or a motion program of the robot. Also, orientations (ai, bi, ci) [i=1, 2 . . . ] of faces in the vicinity of the working line are measured in correspondence to the respective points. The number of faces to be measured is considered to be ordinarily two, but it may be one or three or more in some cases. In such a case where an attitude of a tool center point is taught to the robot, these face orientation data and unit vectors (di, ei, fi) [i=1, 2 . . . ] representing the direction of the working line can be utilized.

Incidentally, there may be a case where a redundant point is thinned from a plurality of detected points, or a case where the sequence of the points detected is approximated to a straight line or an arc line by the method of least squares or the like to reproduce the teaching points of the robot. In such a case, the points detected do not correspond to the teaching points directly.

Also, there may be a case where the points constituting the working line can not be specified, by reason of erroneous detection of line from the image of the camera, failure of detection of the working line, and so on. Therefore, it is preferable to introduce a step for verifying the detection results. Specifically, as shown in FIG. 1, the image of the camera 2 is displayed on a screen of the image display device 3, and the detected point positions (a sequence of points 10) constituting the working line are displayed while being superimposed on this image.

Alternatively, the detected working line is displayed on an image display device 3 with the color or thickness changed while being superimposed on the image of the camera 2 displayed on the image display device 3.

An operator confirms the image and the detected positions displayed on the image (when they can not be detected, such a fact is notified to the operator through a message). In a case where a correct position has not been detected, the correct position is specified on the image using the position pointing device 4 (a mouse of a computer, for example) on the 2-dimensional image.

The 3-dimensional position of the detected position is re-calculated from the position specified on the image and the plane measured. Thereby, even when the point which has been detected from the image of the camera is erroneous or even when the point has not been detected, the teaching point data can be created according to the instruction of the operator.

Furthermore, one of typical methods for detecting a working line from a camera image is a technique using a pattern matching. In this technique, a line shape to be detected on an image is stored as a teaching pattern in advance, and a position of an image pattern similar to the teaching pattern is detected from an input camera image at a time of detection. In this technique, since a pattern similar to the teaching pattern is detected from the image, the detected portion extending along the working line must be similar to the teaching pattern.

In an actual object to be worked, however, there may occur a case where it is difficult to detect a complete route using only one teaching pattern because the working line on the image does not appear uniformly due to a reflection state of a surface of the object, an illumination state around the object, or the like. In view of this fact, in the present invention, when a working line has been detected from an image correctly, an image of the working line detected is stored as a teaching pattern, and the next detection is performed using a teaching pattern created from the image thus detected.

Thereby, since the teaching data is always updated on the basis of the previous detection result, even when the working line appears in a changing manner on the image, the working line can be detected without influence of such a change of appearance as compared with a case where only one teaching data piece is used. Here, the method for recording a teaching pattern has been explained with the example of the pattern matching, but a method for detecting an object using feature amount on an image (for example, a direction, an intensity or the like of an edge point) is generally applicable to a working line detection.

Further, when a line shape is detected, it is preferable to selectively use an optimal detecting method on the basis of a difference in shape such as a straight line, a curved line, an arc or the like, but it is difficult to always recognize the shape of a line from the image data correctly. Therefore, an operator indicates the shape of a line to be detected so that a more preferable detecting method can be applied to a working line detection.

Figure 2:
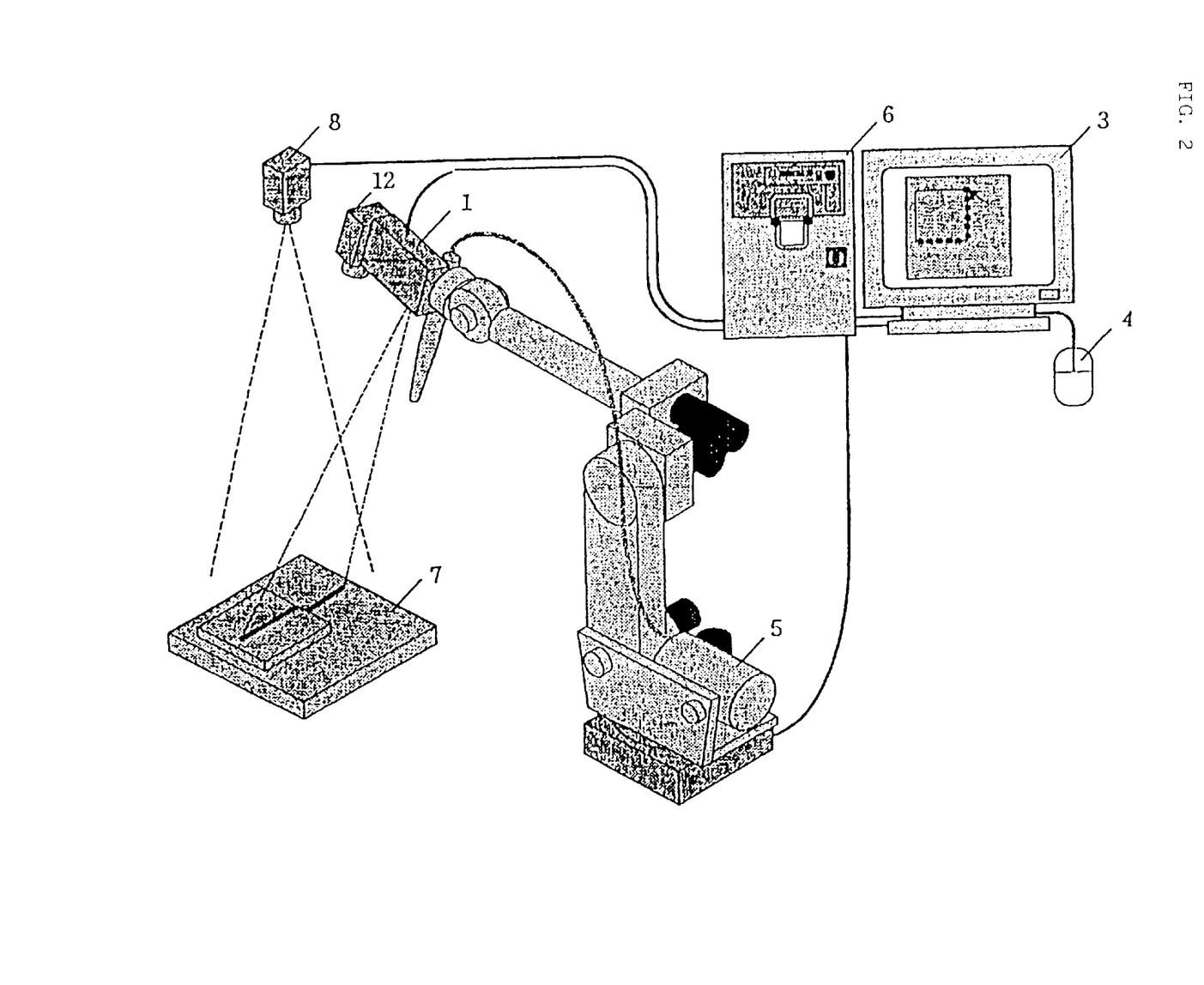
FIG. 2 is a perspective view showing a schematic arrangement in a second embodiment of the present invention.

A second embodiment of the invention will be explained with reference to FIG. 2.

Mounted at an arm distal end of a robot 5 which is an object to be taught are an image pickup device (camera) 12 and a projector 1. The projector 1 has a function for projecting a pattern light. In the embodiment shown in FIG. 2, a slit light projecting type is employed as the projector 1 in the same manner as the case of the first embodiment (FIG. 1). However, in this embodiment, a fixed camera 8 for photographing a 2-dimensional image, which is arranged so as to overlook a whole working space with a proper distance is utilized as an image pickup device (camera).

A robot controller 6 is of a type that an image processing device is housed therein, and it is connected to the robot 5, the projector 1, the fixed camera 8, a display device 3 and a teaching operation panel (not shown). This robot controller 6 may be similar to that in the first embodiment. A reference work 7 serves as a reference for a teaching work and it is positioned accurately in a teaching work space.

For teaching, first, the robot 5 is caused to move, for example, with a manual operation to a position and an attitude suitable for projection with a proper distance from the reference work 7. Next, an image including the reference work 7 in a field of view is picked up using the fixed camera 8 and the image is displayed on the image display device 3. A position (measurement starting point) to be measured by the robot 5 is pointed on an image using the image position pointing device 4. Coordinates (u0, V0) of the position pointed on the image are stored in the robot controller 6. Since another method for pointing a position to be measured is similar to that in the first embodiment, explanation thereof will be omitted.

The measurement starting point is ordinarily selected on a working line on which an actual working is performed and in the vicinity of a work starting point. After the measurement starting point is specified, a view line (a 3-dimensional straight line connecting the measurement starting point and a center of a lens of the fixed camera 8) corresponding to the position (u0, v0) is obtained using the position (u0, v0) on the 2-dimensional image and the position and the orientation of the fixed camera 8. The robot 5 is caused to approach te the reference work 7 in a manner such that a projecting direction of the projector 1 does not deviate from the view line, so that it is moved up to a position where a 3-dimensional position on the reference work 7 and an inclination of the face at the position can be measured.

Next, a slit light is projected from the projector 1 onto the reference work 7, measurement of a 3-dimensional position on the reference work 7 and an inclination (orientation) of a face in the vicinity thereof is started. For the measurement, a slit light is projected on the reference work 7 from the projector 1. A projecting direction of a slit line at the measurement starting time (a position and a direction of a bright line formed on the reference work 7 by a slit line) is adjusted such that it crosses the working line in the vicinity of the specified measurement starting point. An image including an image of the bright line formed on the reference work 7 is photographed by the fixed camera 8 and a 3-dimensional position (x1, y1, z1) of the measurement starting point is measured according to the principle of a trigonometrical survey.

Also, like the first embodiment (FIG. 1), such a technique can be employed in which an image including an image of the bright line is photographed by a camera 12 at a distal end of a robot arm and the 3-dimensional position (x1, y1, z1) at the measurement starting point is measured according to the principle of the trigonometrical survey.

The position on the image corresponding to this measurement starting point is defined as (u1, v1). Since the principle of the measurement and processing performed for measurement by the robot controller 6 are well known, description thereof will be omitted here.

The robot is moved along a working path a small distance by a small distance, and light projecting and photographing are performed for each small distance movement, so that 3-dimensional positions (x2, y2, z2), (x3, y3, z3) . . . of points at which the bright line crosses the working line are sequentially obtained.

The 3-dimentional positions (xi, yi, zi) [i=1, 2 . . . ] of a sequence of the points which constitute the working line thus obtained are utilized as teaching points of the robot to produce the movement path or a motion program of the robot 5. Also, orientations (ai, bi, ci) [i=1, 2 . . . ] of faces in the vicinity of the working line are measured in correspondence to the respective points. The number of faces to be measured is considered to be ordinarily two, but it may be one or three or more in some cases. In a case where an attitude of a tool center point is taught to the robot, these face orientation data and unit vectors (di, ei, fi) [i=1, 2 . . . ] representing the direction of the working line can be utilized.

Besides the above, this embodiment is not so different from the first embodiment regarding a thinning process of redundant detected points, an approximating process using a straight line or an arc, a countermeasure for an erroneous detection or a detection disenable state (re-designation of measurement points and measuring them), and an application of a pattern matching process or the like, so that repetitive explanation will be omitted.

Figure 3:
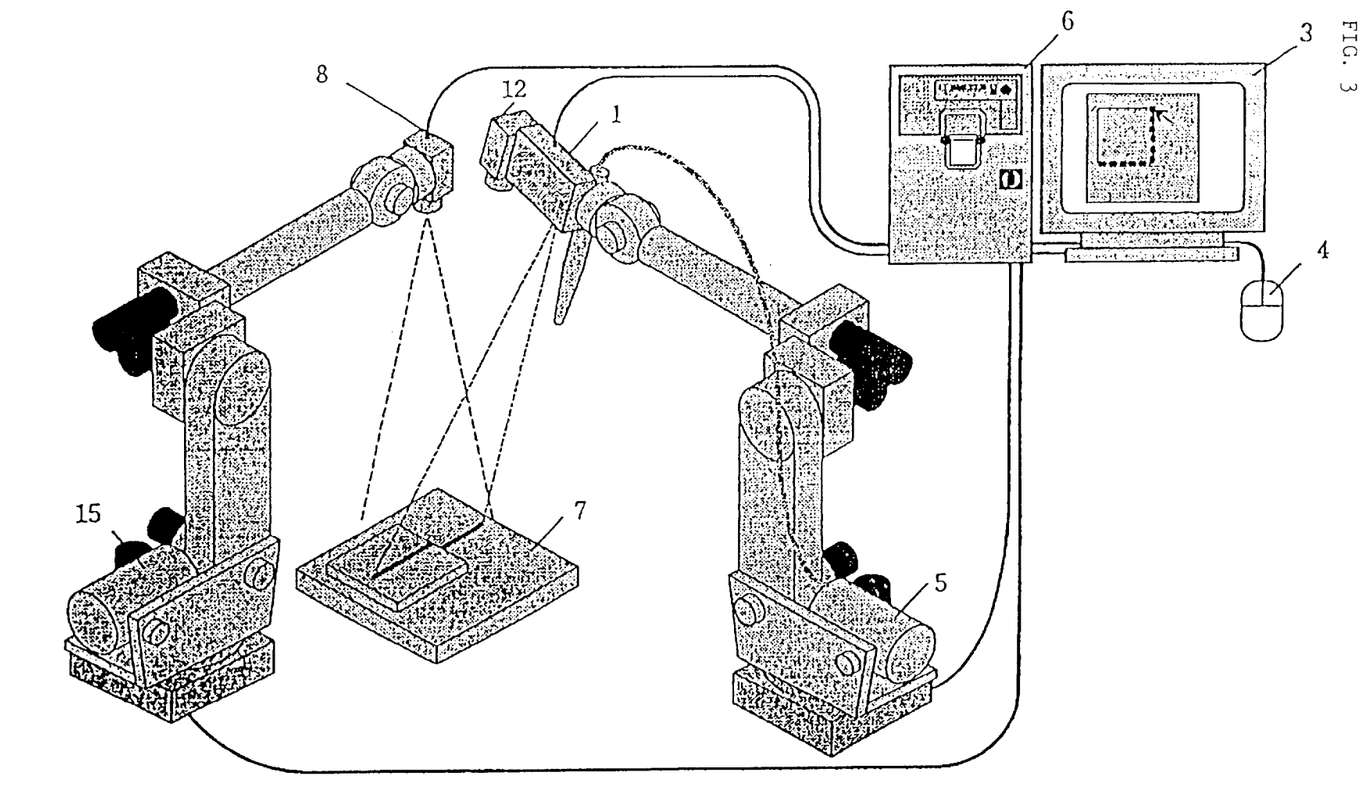
FIG. 3 is a perspective view showing a schematic arrangement in a third embodiment of the present invention.

A third embodiment of the invention will be explained with reference to FIG. 3.

Mounted at an arm distal end of a robot 5 which is an object to be taught is a projector 1. The projector 1 has a function for projecting a pattern light. In the embodiment shown in FIG. 3, a silt light projecting type is employed as the projector 1 in the same manner as in the cases shown in FIGS. 1 and 2.

In this embodiment, a camera 8 for photographing a 2-dimensional image is mounted at a distal end of an arm of a robot 15 (referred to as a second robot) which is provided in addition to the robot 5 (referred to as a first robot). The second robot 15 constitutes a moving device of a camera 8. The camera 8 mounted on the second robot 15 is utilized for teaching the first robot 5.

A robot controller 6 is of a type that an image processing device is housed therein, and it is connected to the first robot 5, the second robot 15, the projector 1, the camera 8, the display device 3 and the teaching operation panel (not shown).

This robot controller 6 may be similar to that in the first embodiment. However, a hardware and a software for controlling the second robot 15 is further provided in the robot controller 6. A reference work 7 serves as a reference for a teaching work and it is positioned accurately in a teaching work space.

For teaching, first, the first robot 5 is caused to move, for example, with a manual operation to a position and an attitude suitable for projection with a proper distance from the reference work 7. Similarly, the second robot 15 is caused to move to a position and an attitude where it can include the reference work 7 in its field of view with a proper distance from the reference work 7.

Next, an image including the reference work 7 in the field of view is captured using the camera 8 mounted on the second robot 15, and the image is displayed on the image display device 3. A position (measurement starting point) to be measured by the first robot 5 is pointed on an image using an image position pointing device 4 (refer to an arrow). Coordinates (u0, V0) of the position pointed on the image are stored in the robot controller 6. Since another method for pointing a position to be measured is similar to those in the first and second embodiments, explanation thereof will be omitted.

The measurement starting point is ordinarily selected on a working line on which an actual working is performed and in the vicinity of a work starting point. After the measurement starting point is specified, a view line (a 3-dimensional straight line connecting the measurement starting point and a center of a lens of the camera 8) corresponding to the position (u0, v0) is obtained using the position (u0, v0) on the 2-dimensional image and the position and the orientation of the camera 8. The first robot 5 is caused to approach the reference work 7 such that a projecting direction of the projector 1 does not deviate from the view line, so that it is moved up to a position where a 3-dimensional position on the reference work 7 and an inclination of the face at the position can be measured.

Next, a slit light is projected from the projector 1 onto the reference work 7, measurement of a 3-dimensional position on the reference work 7 and an inclination (orientation) of a face in the vicinity thereof is started. A projecting direction (a position and a direction of a bright line formed on the reference work 7 by a slit light) of the slit light at the measurement starting time is adjusted such that it crosses the working line in the vicinity of the specified measurement starting point. An image including an image of the bright line formed on the reference work 7 is photographed by the camera 8 (or by the camera 12 mounted on the distal end of the first robot 5 for teaching) and a 3-dimensional position (x1, y1, z1) of the measurement starting point is measured according to the principle of a trigonometrical survey. The position on the image corresponding to this measurement starting point is defined as (u1, v1). Since the principle of the measurement and processing performed for measurement by the robot controller 6 are well known, description thereof will be omitted here.

The robot is moved along a working path a small distance by a small distance, and light projecting and photographing are performed for each small distance movement, so that 3-dimensional positions (x2, y2, z2), (x3, y3, z3) . . . of points at which the bright line crosses the working line are sequentially obtained.

The 3-dimentional positions (xi, yi, zi) [i=1, 2 . . . ] of a sequence of the points which constitute the working line thus obtained are utilized as teaching points of the robot to produce the movement path or a motion program of the robot 5. Also, orientations (ai, bi, ci) [i=1, 2 . . . ] of faces in the vicinity of the working line are measured in correspondence to the respective points. The number of faces to be measured is considered to be ordinarily two, but it may be one or three or more in some cases. In such a case where an attitude of a tool tip end point is taught to the robot 5, these face orientation data and unit vectors (di, ei, fi) [i=1, 2 . . . ] representing the direction of the working line can be utilized.

Besides the above, this embodiment is not so different from the first and second embodiments regarding a thinning process of a redundant detected points, an approximating process using a straight line or an arc, a countermeasure for an erroneous detection or a detection disenable state (re-designation of measurement points and measuring them), an application of a pattern matching process and the like, so that repetitive explanation will be omitted.

Figure 4:
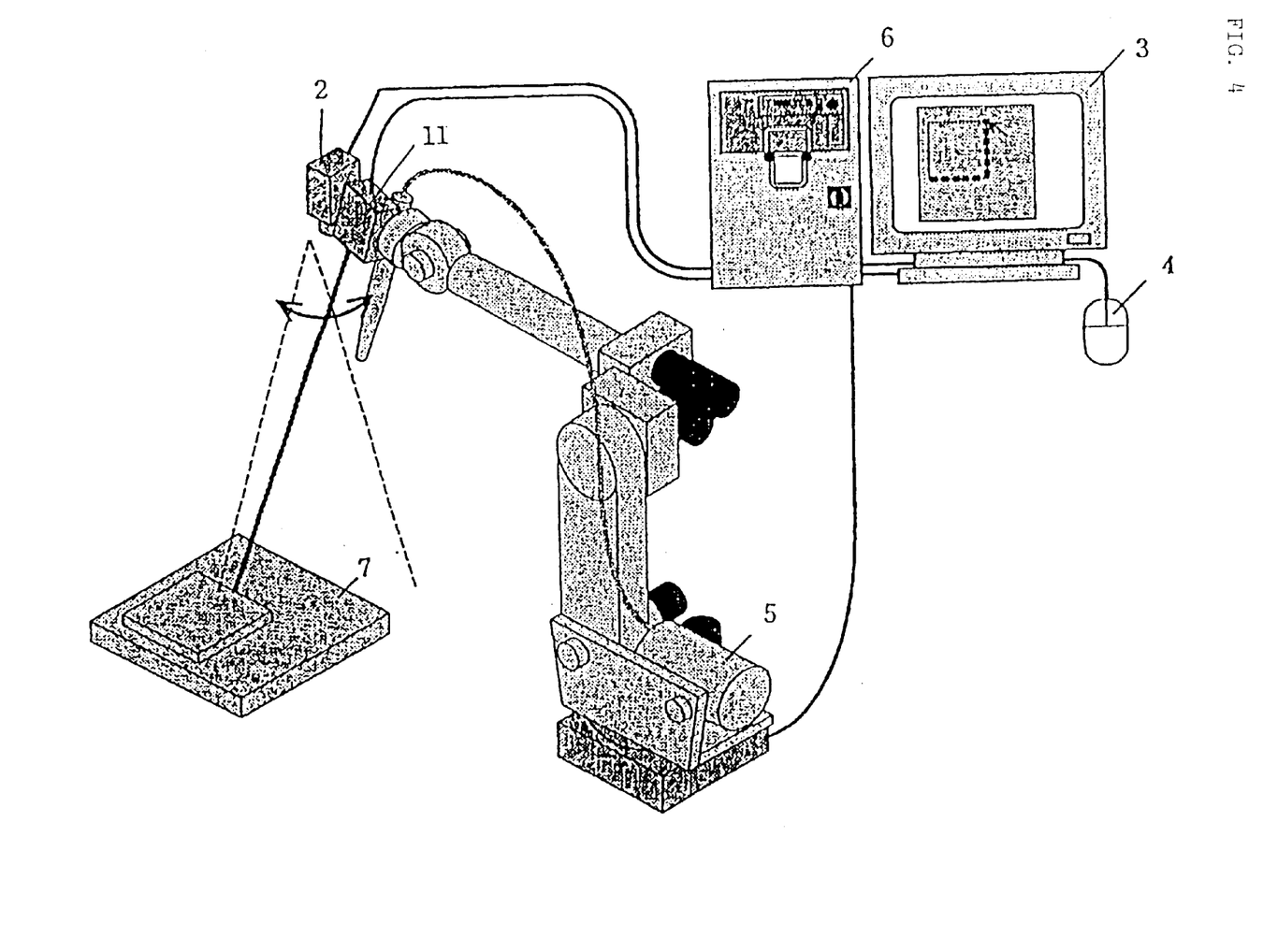
FIG. 4 is a perspective view showing a schematic arrangement in a fourth embodiment of the present invention.

A fourth embodiment of the invention will be explained with reference to FIG. 4.

Mounted at an arm distal end of a robot 5 which is an object to be taught are a projector 11 and a camera 2. The projector 11 has a function for projecting a spot light as a pattern light within a predetermined range in any direction instructed from a robot controller 6.

The robot controller 6 is of a type that an image processing device is housed therein, and it is connected to the robot 5, the projector 11, the camera 2, a display device 3 and a teaching operation panel (not shown).

Figure 1:
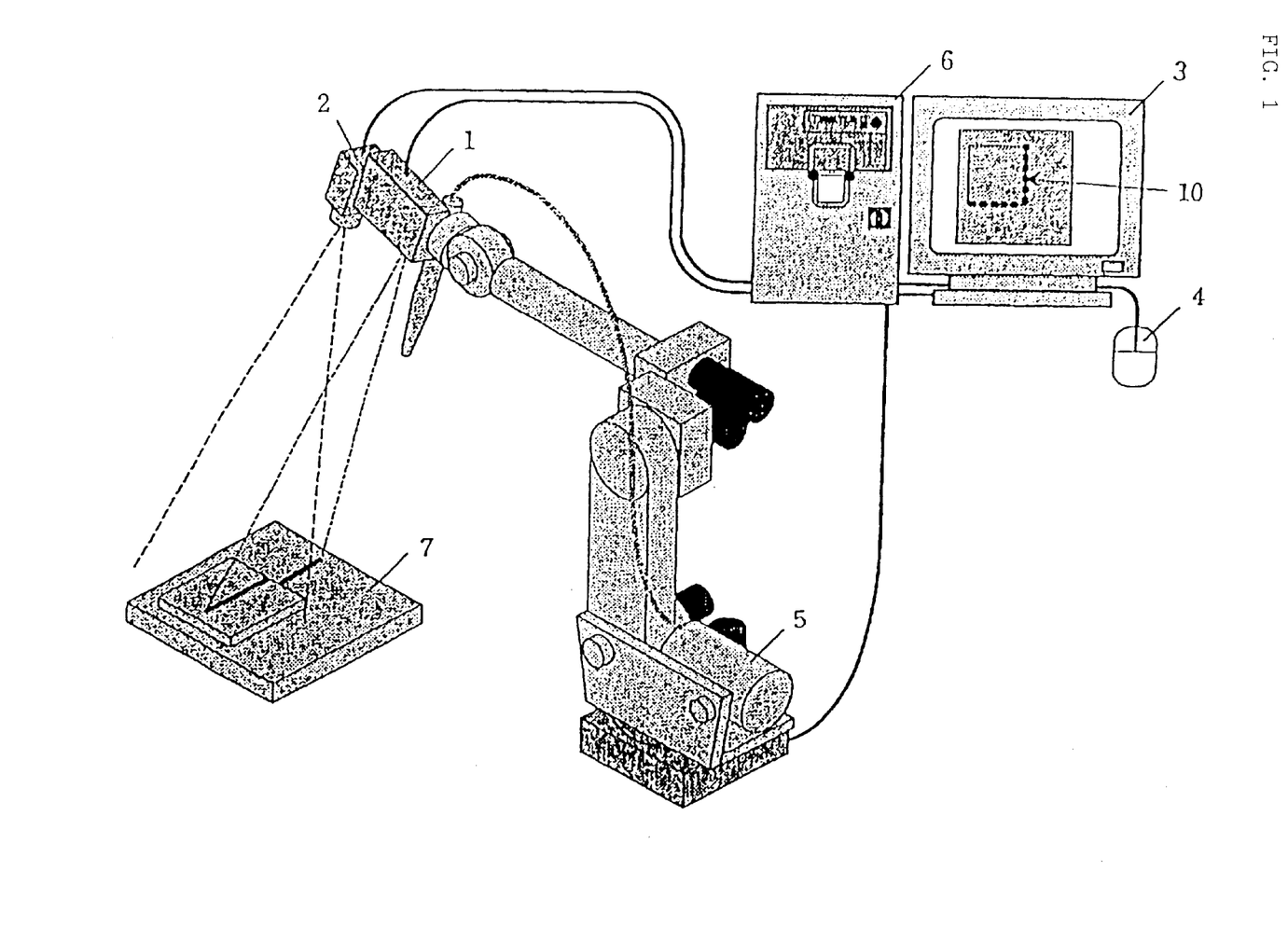
FIG. 1 is a perspective view showing a schematic arrangement in a first embodiment of the present invention.

This robot controller 6 may be similar to that in the first embodiment (FIG. 1). However, a hardware and a software are slightly changed in correspondence to change of the projector 11 to the spot light projecting type. Such a change is well known and therefore explanation thereof will be omitted here. A reference work 7 serves as a reference for a teaching work and it is positioned accurately in a teaching work space.

For teaching, first, the robot 5 is caused to move, for example, with a manual operation, to a position and an attitude where it can include the reference work 7, by the camera 2 in its field of view with a proper distance from the reference work 7.

Next, an image including the reference work 7 in the field of view is captured using the camera 2, and the image is displayed on the image display device 3. A position (measurement starting point) to be measured by the robot 5 is pointed on an image using a point device 4 provided on the image display device 3 (refer to an arrow). Coordinates (u0, v0) of the position pointed on the image are stored in the robot controller 6. Since another method for pointing a position to be measured is similar to those in the above-mentioned embodiments, explanation thereof will be omitted.

The measurement starting point is ordinarily selected on a working line on which an actual working is performed and in the vicinity of a work starting point. After the measurement starting point is specified, a view line (a 3-dimensional straight line connecting the measurement starting point and a center of a lens of the camera 2) corresponding to the position (u0, v0) is obtained using the position (u0, v0) on the 2-dimensional image and the position and the orientation of the camera 2. Then, the robot 5 is caused to approach the reference work 7 such that a projecting direction of the projector 1 does not deviate from the view line, so that it is moved up to a position where a 3-dimensional position on the reference work 7 and an inclination of the face at the position can be measured.

Next, a spot light is projected from the projector 11 onto the reference work 7, measurement of a 3-dimensional position on the reference work 7 and an inclination (orientation) of a face in the vicinity thereof is started. A projecting direction (the position of a bright point formed on the reference work 7 by a spot light) at the measurement starting time is adjusted so as to be positioned in the vicinity of the specified measurement starting point. An image including an image of the bright point formed on the reference work 7 is photographed by the camera 2 and a 3-dimensional position (x1, y1, z1) of the measurement starting point is measured according to the principle of a trigonometrical survey. The position on the image corresponding to this measurement starting point is defined as (u1, v1). Since the principle of the measurement and processing performed for measurement by the robot controller 6 are well known, description thereof will be omitted here.

Incidentally, for measuring an orientation of a face around the 3-dimensional position, measurement of at least three points is performed for detection of each face in one robot position. These three or more points are spaced from one another by a small distance in a manner such that they are not aligned on one straight line.

The robot is moved along a working path a small distance by a small distance, and light projecting and photographing are performed for each small distance movement, so that 3-dimensional positions of the bright points (a plurality of points for each step) are sequentially obtained.

The 3-dimensional position of the working line is obtained on the basis of respective positions of faces around the working line thus obtained, and points on the working line are utilized as teaching points to create a movement path of the robot.

For example, in a case where the working line corresponds to a crossing line of two planes A and B, the crossing line of the planes A and B is calculated in the robot controller 6, and sampling points at predetermined intervals on the crossing line are selected as teaching points and the 3-dimensional positions of these teaching points are stored as positions of the teaching points. Also, it is possible to teach the attitude of the robot 5 (an attitude of a tool center point) on the basis of the face orientation data of the planes A and B and data of unit vectors representing the direction of the working line.

Besides the above, this embodiment is not different from the above embodiments regarding a thinning process of a redundant detected points, an approximating process using a straight line or an arc, a countermeasure for an erroneous detection or a detection disenable state (re-designation of measurement points and measuring them), an application of a pattern matching process or the like, so that repetitive explanation will be omitted.

Figure 5:
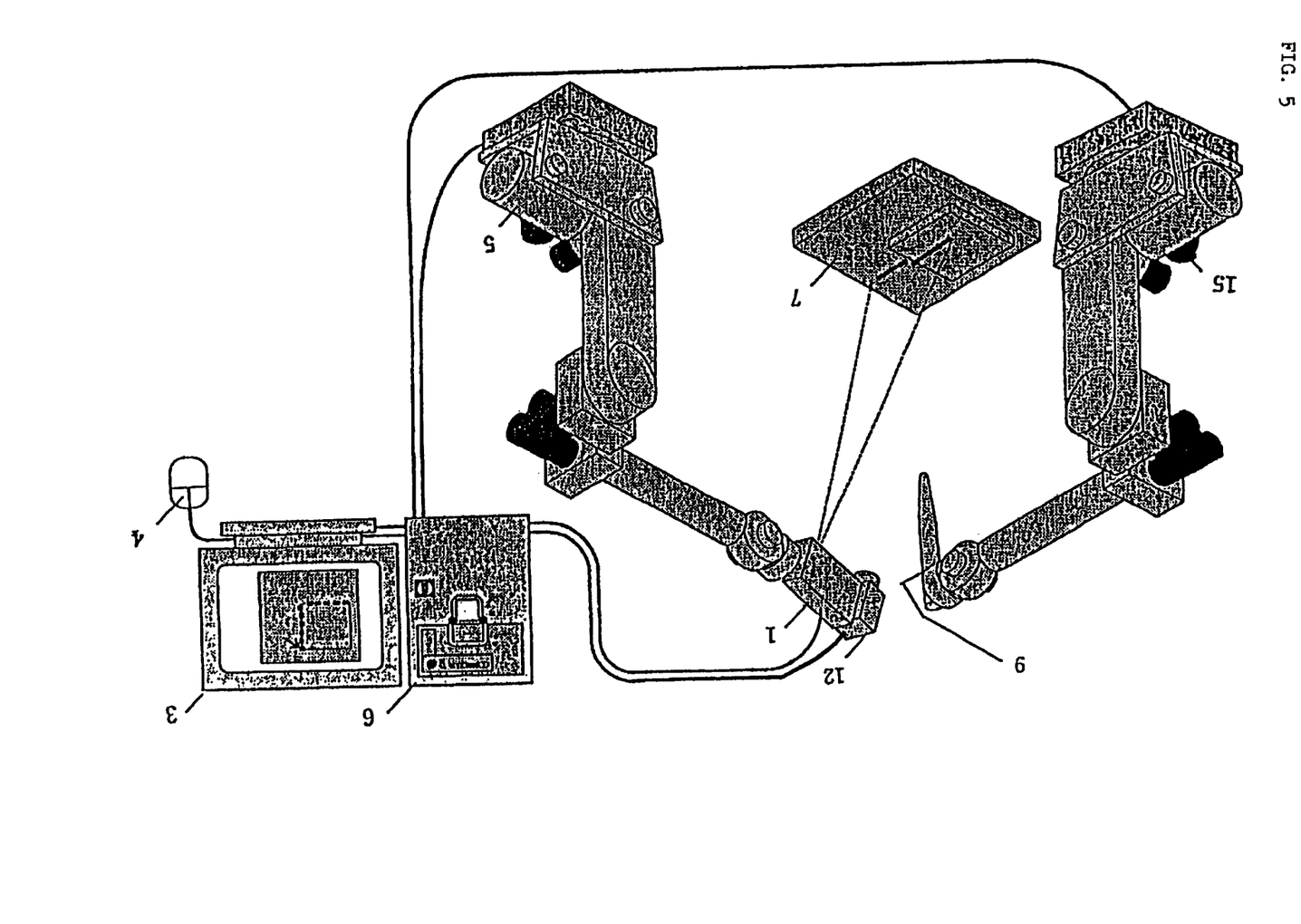
FIG. 5 is a perspective view showing a schematic arrangement in a fifth embodiment of the present invention.

A fifth embodiment of the invention will be explained with reference to FIG. 5.

A first robot 5 serves as a teaching robot, and a second robot 15 provided separately of this first robot 5 is a working robot for performing an actual work. That is, the first robot 5 is used in teaching for movement along the taught positions and the second robot 15 performs an actual work such as a welding work.

In this embodiment, an image pickup device (camera) 12 and a projector 1 are mounted at a arm distal end portion of the first robot 5 in charge of the teaching work. The projector 1 has a function for projecting a pattern light and a projector of a slit light projecting type is employed as the projector 1. On the other hand, a working tool 9 is mounted at an arm distal end of the robot 15 in charge of an actual work.

A robot controller 6 is of a type that an image processing device is housed therein, and it is connected to the first robot 5, the second robot 15, the projector 1, the image pickup device (camera) 12, a display device 3 and a teaching operation panel (not shown).

This robot controller 6 may be similar to that in the first embodiment (FIG. 1). However, a hardware and a software for controlling the second robot 15 are provided in the robot controller 6. A reference work 7 serves as a reference for a teaching work and it is positioned accurately in a teaching work space.

For teaching, first, the first robot 5 is caused to move, for example, with a manual operation, to a position and an attitude suitable for projecting and photographing with a proper distance from the reference work 7.

Next, an image including the reference work 7 in the field of view is captured using the camera 12, and the image is displayed on the image display device 3. A position (measurement starting point) to be measured by the first robot 5 is pointed on an image using a pointing device 4 provided to the image display device 3 (refer to an arrow). Coordinates (u0, V0) of the position pointed on the image are stored in the robot controller 6. Since another method for pointing a position to be measured is similar to those in the above-mentioned embodiments, explanation thereof will be omitted.

The measurement starting point is ordinarily selected on a working line on which an actual working is performed and in the vicinity of a work starting point. After the measurement starting point is specified, a view line (a 3-dimensional straight line connecting the measurement starting point and a center of a lens of the camera 12) corresponding to the position (u0, v0) is obtained using the position (u0, v0) on the 2-dimensional image and the position and the orientation of the camera 12. Then, the robot 5 is caused to approach the reference work 7 such that a projecting direction of the projector 1 does not deviate from the view line, so that it is moved up to a position where a 3-dimensional position on the reference work 7 and an inclination of the face at the position can be measured.

Next, a slit light is projected from the projector 1 onto the reference work 7, so that measurement of a 3-dimensional position on the reference work 7 and an inclination (orientation) of a face in the vicinity thereof is started. A projecting direction (a position and a direction of a bright line formed on the reference work 7 by a slit light) of the slit light at the measurement starting time is adjusted such that it crosses the working line in the vicinity of the specified measurement starting point. An image including an image of the bright line formed on the reference work 7 is photographed by the camera 2 and a 3-dimensional position (x1, y1, z1) of the measurement starting point is measured according to the principle of a trigonometrical survey. The position on the image corresponding to this measurement starting point is defined as (u1, v1). Since the principle of the measurement and processing performed for measurement by the robot controller 6 are well known, description thereof will be omitted here.

The first robot 5 is moved along a working path a small distance by a small distance, and light projecting and photographing are performed for each small distance movement, so that 3-dimensional positions (x2, y2, z2), (x3, y3, z3), ... at which the bright line crosses the working line are sequentially obtained.

The 3-dimentional positions (xi, yi, zi) [i=1, 2 ... ] of a sequence of the points which constitute the working line thus obtained are utilized as teaching points of the robot to produce the movement path or a motion program of the second robot 15. Also, orientations (ai, bi, ci) [i=1, 2 ... ] of faces in the vicinity the working line are measured to correspond to the respective points. The number of faces to be measured is considered to be ordinarily two, but it may be one or three or more in some cases. In such a case where an attitude of a tool center point is taught to the robot 5, these face orientation data and unit vectors (di, ei, fi) [i=1, 2 ... ] representing the direction of the working line can be utilized.

Incidentally, in a case where the coordinate system which serves as a reference of motion of the second robot 15 for working is different from the coordinate system which serves as a reference of motion of the first robot 5 for teaching, conversion is performed between both the coordinate systems using a transformation equation so that the teaching data for the second robot 15 can be obtained. Since how to obtain a transformation equation between different motion-base coordinate systems between two robots (in general, expressed by a homogeneous transformation matrix of 4 row and 4 column) is well-known, explanation thereof will be omitted. For example, when there is a world coordinate system common to both the coordinates, transformation can be performed through the world coordinate system.

Besides the above, this embodiment is not different from the above embodiments regarding a thinning process of a redundant detected points, an approximating process using a straight line or an arc, a countermeasure for an erroneous detection or a detection disenable state (re-designation of measurement points and measuring them), an application of a pattern matching process or the like, so that repetitive explanation will be omitted.

Also, in the embodiments of the present invention shown in FIGS. 1 to 5, the projector 1 or 11 and the 2-dimensional image pickup device 2 or 12 which are mounted on the robot may be mounted on the robot for teaching at a time of teaching and they may be detached from the robot when the robot performs working. Since the measuring devices such as the projector or the image pickup device are detached from the robot at the time of working in this manner, a merit or an advantage that an interference between the projector or the 2-dimensional image pickup device and the object to be worked can be avoided can be achieved and also a set of the measuring devices can be used commonly for a plurality of robots for teaching.

The above-mentioned embodiments can take the following aspects.

Information about a position or a locus on which a working robot operates is marked on an object to be worked in advance. Then, a position of the marking on an image of a camera is detected by means for specifying points constituting a working line.

The means for specifying points constituting a working line performs image processing for detecting a line section along the working line to specify the points constituting the working line.

The points constituting the working line specified as well as the image of the camera are displayed on the display means. Then, when the point specified is different from a point to be recognized, an operator can indicate a correct point to be recognized on the camera image so that he/she can specify it again.

When the points constituting the working line, which are to be recognized, are specified on the image of the camera, a feature amount required for detecting points to be recognized by image processing is recorded form the image of the camera. Then, the points constituting the working line are specified by moving the teaching robot along the working path and performing image processing using the recorded feature amount (that is, in the next and subsequent recognition, the points constituting the working line are automatically specified by the image processing using the recorded feature amount).

By performing an image processing on the basis of a shape (a straight line, a circle, a curved line or the like) of a working line on the image of the camera specified by an operator in advance, points constituting the working line are specified.

When the teaching robot is moved from the current image taking-in position to the next image taking-in position, the next image taking-in position is obtained on the basis of 3-dimensional positions of a plurality of points obtained by the current time. Also, the next image taking-in position is obtained on the basis of the 2-dimensional positions of the plurality of points constituting the working line on the image and the attitude of a plane, which have been specified until the current time. That is, the next image taking-in position is determined using the 3-dimensional positions or the 2-dimensional positions which have been specified until the current time, and the robot is moved to the image taking-in position. By moving the robot in this manner, the points constituting a working line are specified continuously. Also, when the next image taking-in position is obtained, the shape of the working line is considered.

From the position of a measuring portion on the image of the camera and the position of the camera at the image taking-in time, a straight line (a view line of a camera) within a space connecting the measuring portion and the camera is obtained. The attitude of the camera or the projector is determined such that the measuring portion existing on the straight line can be measured. The camera or the projector is caused to approach an object along the straight line so that it is moved up to a position at which 3-dimensional information can be measured. That is, prior to starting detection of points constituting the working line, from the position of a detection starting point on an image having a field of view wider than that at the recognition time, a straight line within a space in which the detecting starting position exists is determined as a field of view of the camera, and then the 3-dimensional sensor (the projector or the camera) is caused to approach te the measuring position along the straight line. As a result, even when the 3-dimensional position of the starting position of measurement is unknown, it becomes possible to cause the camera or the projector to approach te the position in a state where the starting point has been grasped correctly.

The projecting means and the camera are attached to the robot at the time of teaching and they are detached therefrom at the time of working.

The robot teaching apparatus is further provided with means for creating a working program of the working robot from the 3-dimensional positions of the points constituting the working line specified.

What is claimed is:

1. A robot teaching apparatus comprising:
    a teaching robot provided with projecting means for projecting a slit light or a spot-light on a stationary reference object as a pattern light;
    a camera to obtain teaching points for a working robot for performing working along a working line on the object;
    means for, from an image of the camera about a face of the object on which the pattern light is projected, obtaining a 3-dimensional position and an attitude of the face;
    means for specifying points constituting the working line on the image of the camera; and
    means for obtaining 3-dimensional positions of the specified points constituting the working line on the basis of the 3-dimensional position and the attitude of the face, and the positions of the points constituting the working line on the image of the camera.

2. The teaching apparatus according to claim 1, wherein a single robot is used both as the working robot and the teaching robot.

3. The teaching apparatus according to claim 1, wherein said specifying of the points constituting the working line is performed on an image of another camera mounted on another teaching robot or a moving device provided separately of the working robot, or on an image of another camera mounted in a fixing manner separately of the teaching robot.

4. The teaching apparatus according to claim 1, further comprising:
    display means for displaying an image of the camera; and
    position pointing means for pointing a point on an image displayed on the display means,
    wherein said means for specifying points constituting the working line specifies a point on the image of the camera displayed on the display means according to a pointing of said position pointing means.

5. The teaching apparatus according to claim 1, wherein marking of information about a position or a locus where the working robot is to operate is performed on the object in advance, and said means for specifying points constituting the working line detects the position of the marking on the image of the camera.

6. The teaching apparatus according to claim 1, wherein the means for specifying the points constituting the working line performs image processing for detecting a line section along the working line on an image of the camera to specify the points constituting the working line.

7. The teaching apparatus according to claim 6, further comprising:
    display means for displaying the points constituting the working line together with the image of the camera,
    wherein, when the specified point is different from a point to be recognized, a point to be recognized on the image of the camera can be pointed by an operator for specifying the point again.

8. The teaching apparatus according to claim 6, wherein, when the point to be recognized is specified on the image, a feature for detecting the point by image processing from the image is recorded, and
    the teaching robot moves along the working line and the teaching robot specifies the points constituting the working line by image processing from the recorded feature.

9. The teaching apparatus according to claim 6, wherein the image processing is performed on the working line on the image of the camera on the basis of the shape of the working line specified by the operator so that specifying of the points constituting the working line is performed.

10. The teaching apparatus according to claim 1, wherein, the teaching robot moves from the a current image taking-in position to a next image taking-in position, and the next image taking-in position is obtained on the basis of 3-dimensional positions of a plurality of points which have been obtained until the current time.

11. The teaching apparatus according to claim 1, wherein, the teaching robot moves from a current image taking-in position to a next image taking-in position, the next image taking-in position is obtained on the basis of 2-dimensional positions of a plurality of points constituting the working line which has been specified until the current time on the image, and the attitude of the face.

12. The teaching apparatus according to claim 10, wherein, when the next image taking-in position is obtained, the next image taking-in position is obtained further on the basis of the shape of the working line.

13. The teaching apparatus according to claim 1, wherein, from a position of a measuring portion on the image of the camera and a position of the camera at a time of the image taking-in, a straight line (a view line of the camera) within a space connecting the measuring portion on the camera is obtained, an attitude of the camera or the projector is determined such that the measuring portion existing on the straight line can be measured, and the camera or the projecting means approach to the object to be moved up to a position where 3-dimensional information can be measured.

14. A teaching apparatus according to claim 1, wherein the projecting means and the camera are mounted on the robot at a time of teaching and are detached therefrom at a time of working.

15. A teaching apparatus according to claim 1, further comprising means for creating a working program for the working robot from 3-dimensional positions of the specified point constituting the working line.

* * * * *

UNITED STATES PATENT AND TRADEMARK OFFICE
CERTIFICATE OF CORRECTION

PATENT NO. : 6,763,284 B2
DATED : July 13, 2004
INVENTOR(S) : Atsushi Watanabe et al.

It is certified that error appears in the above-identified patent and that said Letters Patent is hereby corrected as shown below:

Title page,
Item [56], References Cited, OTHER PUBLICATIONS, "Saki" reference, please change "inspectin" to -- Inspection --
Item [57], ABSTRACT,
Line 5, after "approaches" please delete "to".

Column 4,
Line 56, please change "dimentional" to -- dimensional --.

Column 6,
Line 50, after "approach", please delete "te".

Column 11,
Line 2, please delete both occurrences of "a".

Column 13,
Lines 42 and 46, after "approach", please delete "te".

Column 14,
Line 59, after "from", please delete "the".

Signed and Sealed this

Twelfth Day of October, 2004

JON W. DUDAS
*Director of the United States Patent and Trademark Office*